(12) United States Patent
Xu

(10) Patent No.: US 9,794,415 B2
(45) Date of Patent: *Oct. 17, 2017

(54) CALLING METHODS AND DEVICES

(71) Applicant: Xiaomi Inc., Beijing (CN)

(72) Inventor: Ruijun Xu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,605

(22) Filed: Jun. 29, 2016

(65) Prior Publication Data

US 2016/0309041 A1     Oct. 20, 2016

Related U.S. Application Data

(63) Continuation of application No. 14/638,999, filed on Mar. 4, 2015, now Pat. No. 9,420,440, which is a (Continued)

(30) Foreign Application Priority Data

Jul. 21, 2014   (CN) .......................... 2014 1 0347392

(51) Int. Cl.
*H04M 7/00*     (2006.01)
*H04W 4/16*     (2009.01)
(Continued)

(52) U.S. Cl.
CPC ..... *H04M 7/0039* (2013.01); *H04M 1/72561* (2013.01); *H04M 3/42059* (2013.01);
(Continued)

(58) Field of Classification Search
CPC ......... H04M 1/72561; H04M 1/72522; H04M 7/0027; H04M 7/0039; H04M 3/5183; H04M 3/42059; H04W 4/16
See application file for complete search history.

(56) References Cited

U.S. PATENT DOCUMENTS 7,117,001 B2   10/2006   Lin et al.
7,526,252 B2    4/2009   Rekimoto et al.
(Continued)

FOREIGN PATENT DOCUMENTS

CN   1518326 A   8/2004
CN   1809102 A   7/2006
(Continued)

OTHER PUBLICATIONS

Extended European Search Report for Application No. 15171439.1, mailed from the European Patent Office on Dec. 3, 2015.
(Continued)

*Primary Examiner* — Leon Flores
(74) *Attorney, Agent, or Firm* — Finnegan, Henderson, Farabow, Garrett & Dunner LLP

(57) ABSTRACT

A calling method for use in a terminal configured to communicate with a device, includes: establishing a data channel with the device for assisting a call, when the terminal is conducting the call with the device through a voice channel; and exchanging interaction information with the device through the data channel, the interaction information being configured to assist a first user of the terminal and a second user of the device in coordinating and interacting when conducting the call.

20 Claims, 20 Drawing Sheets

Related U.S. Application Data continuation of application No. PCT/CN2014/091576, filed on Nov. 19, 2014.

(51) Int. Cl.

| | | |
|---|---|---|
| *H04M 1/725* | (2006.01) | |
| *H04M 3/42* | (2006.01) | |
| *H04M 3/51* | (2006.01) | |
| *H04W 88/06* | (2009.01) | |

(52) U.S. Cl.
CPC .......... *H04M 7/0027* (2013.01); *H04W 4/16* (2013.01); *H04M 1/72522* (2013.01); *H04M 3/5183* (2013.01); *H04M 2207/30* (2013.01); *H04W 88/06* (2013.01)

(56) References Cited

U.S. PATENT DOCUMENTS

| | | |
|---|---|---|
| 7,539,484 B2 | 5/2009 | Roundtree |
| 8,133,416 B2 | 3/2012 | Mahmoud et al. |
| 8,565,388 B2 | 10/2013 | Mittal |
| 9,282,453 B2 | 3/2016 | Sugaya |
| 9,420,440 B2 * | 8/2016 | Xu ................ H04W 4/16 |
| 2005/0114646 A1 | 5/2005 | Rekimoto et al. |
| 2006/0212482 A1 | 9/2006 | Celik |
| 2007/0135101 A1 | 6/2007 | Ramati et al. |
| 2007/0173237 A1 | 7/2007 | Roundtree |
| 2008/0146256 A1 | 6/2008 | Hawkins et al. |
| 2008/0220810 A1 | 9/2008 | Landschaft et al. |
| 2012/0008755 A1 | 1/2012 | Mittal |
| 2012/0317483 A1 | 12/2012 | Shapiro et al. |
| 2013/0035079 A1 | 2/2013 | O'Doherty |
| 2014/0106720 A1 | 4/2014 | Mairs et al. |
| 2014/0122726 A1 | 5/2014 | Jafry et al. |
| 2015/0087293 A1 | 3/2015 | Sugaya |

FOREIGN PATENT DOCUMENTS

| | | |
|---|---|---|
| CN | 101170727 | 4/2008 |
| CN | 101267600 | 9/2008 |
| CN | 101422025 | 4/2009 |
| CN | 102196104 | 9/2011 |
| EP | 1120955 A2 | 8/2001 |
| JP | 2004-104653 A | 4/2004 |
| JP | 2007-134843 A | 5/2007 |
| JP | 2014-99834 A | 5/2014 |
| RU | 2271615 C2 | 3/2006 |
| RU | 2280332 C2 | 7/2006 |
| RU | 2419832 C2 | 5/2011 |
| WO | WO 2008/131109 A1 | 10/2008 |
| WO | WO 2012/157165 A1 | 11/2012 |

OTHER PUBLICATIONS

International Search Report of PCT/CN2014/091576, mailed from the State Intellectual Property Office of China on Apr. 29, 2015.

Office Action for Russian Application No. 2015105747/08(009229), from the Federal Service for Intellectual Property of Russian Federation, dated May 6, 2016.

* cited by examiner

CALLING METHODS AND DEVICES

CROSS-REFERENCE TO RELATED APPLICATIONS

This application is a continuation of U.S. patent application Ser. No. 14/638,999, filed Mar. 4, 2015, which is a continuation of International Application No. PCT/CN2014/091576, filed Nov. 19, 2014, which is based upon and claims priority to Chinese Patent Application No. 201410347392.9, filed Jul. 21, 2014, the entire contents of all of which are incorporated herein by reference.

TECHNICAL FIELD

The present disclosure generally relates to the field of mobile Internet and, more particularly, to calling methods and calling devices.

BACKGROUND

Telephone has become an indispensable part of people's daily life, by which people can exchange various information. With the quickening pace of life, people's demand for the efficiency of exchanging information while calling is higher and higher.

Conventionally, people exchange information through voice during telephone calls. However, exchanging information through voice alone has a low efficiency.

SUMMARY

According to a first aspect of the present disclosure, there is provided a calling method for use in a terminal configured to communicate with a device, comprising: establishing a data channel with the device for assisting a call, when the terminal is conducting the call with the device through a voice channel; and exchanging interaction information with the device through the data channel, the interaction information being configured to assist a first user of the terminal and a second user of the device in coordinating and interacting when conducting the call.

According to a second aspect of the present disclosure, there is provided a calling method for use in a server associated with a telephone, comprising: establishing a data channel with a terminal for assisting a call, when the telephone is conducting the call with the terminal through a voice channel; and exchanging interaction information with the terminal through the data channel, the interaction information being configured to assist a first user of the terminal and a second user of the telephone in coordinating and interacting when conducting the call.

According to a third aspect of the present disclosure, there is provided a terminal, comprising: a processor; and a memory for storing instructions executable by the processor; wherein the processor is configured to: establish a data channel with a device for assisting a call, when the terminal is conducting the call with the device through a voice channel; and exchange interaction information with the device through the data channel, the interaction information being configured to assist a first user of the terminal and a second user of the device in coordinating and interacting when conducting the call.

According to a fourth aspect of the present disclosure, there is provided a server associated with a telephone, the server comprising: a processor, and a memory for storing instructions executable by the processor; wherein the processor is configured to: establish a data channel with a terminal for assisting a call, when the telephone is conducting the call with the terminal through a voice channel; and exchange interaction information with the terminal through the data channel, the interaction information being configured to assist a first user of the terminal and a second user of the telephone in coordinating and interacting when conducting the call.

BRIEF DESCRIPTION OF THE DRAWINGS

The accompanying drawings, which are incorporated in and constitute a pan of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

In exemplary embodiments, a voice channel is a channel established in a Circuit-Switched domain, for conducting telephone voice services, and a data channel is a channel established in a Packet-Switched domain or in the Internet, for conducting data transmission service.

FIGS. 1A-1D are schematic diagrams illustrating implementation environments 100A, 100B, 100C, and 100D of calling methods, respectively, according to exemplary embodiments. Each implementation environment includes a terminal 110 and a device communicating with the terminal 110, referred here after as an opposite-end device 120. The terminal 110 is an electronic device capable of establishing a voice channel and a data channel at the same time, such as a smartphone, a tablet PC with telephone function, etc.

Figure 1A:
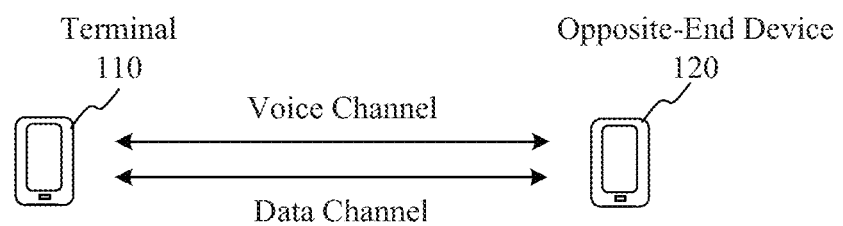
FIGS. 1A-ID are schematic diagrams illustrating implementation environments of calling methods, according to exemplary embodiments.

Referring to FIG. 1A, in the implementation environment 100A, the opposite-end device may be an electronic device similar to the terminal 110, which is capable of establishing a voice channel and a data channel at the same time. Between the terminal 110 and the opposite-end device 120, the voice channel can be established, or both the voice channel and the data channel can be established at the same time.

Figure 1B:
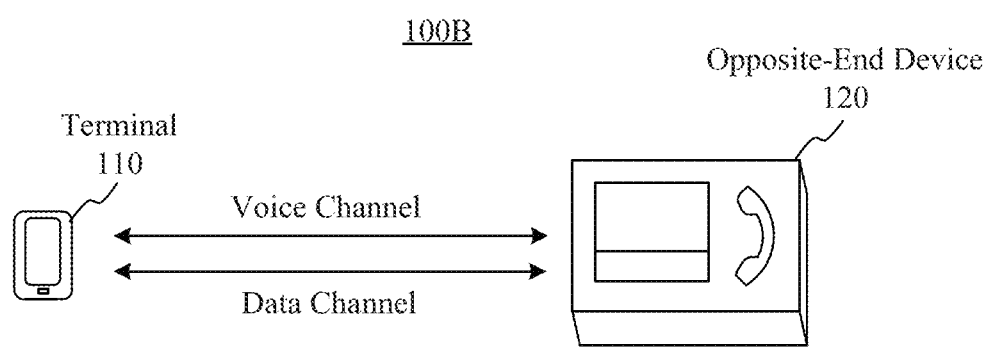

Referring to FIG. 1B, in the implementation environment 100B, the opposite-end device 120 may be an integration device integrating functions of a telephone and a server. The integration device is an electronic device capable of establishing a voice channel and a data channel at the same time, such as a computer integrated with a telephone. Thus, the voice channel and the data channel may be established at the same time between the terminal 110 and the opposite-end device 120.

Figure 1C:
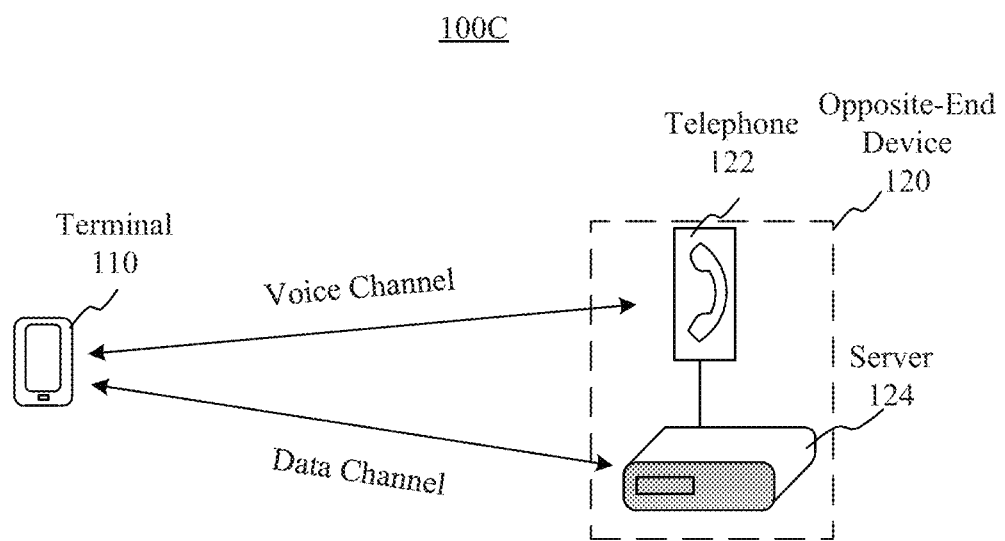

Referring to FIG. 1C, in the implementation environment 100C, the opposite-end device 120 includes a telephone 122, and a server 124 associated with the telephone 122. The telephone 122 may be a landline phone or a mobile phone. The server 124 may be a single server, a server cluster consisting of several servers, a cloud-computing service center, etc. The terminal 110 may establish the voice channel with the telephone 122, and establish the data channel with the server 124.

Figure 1D:
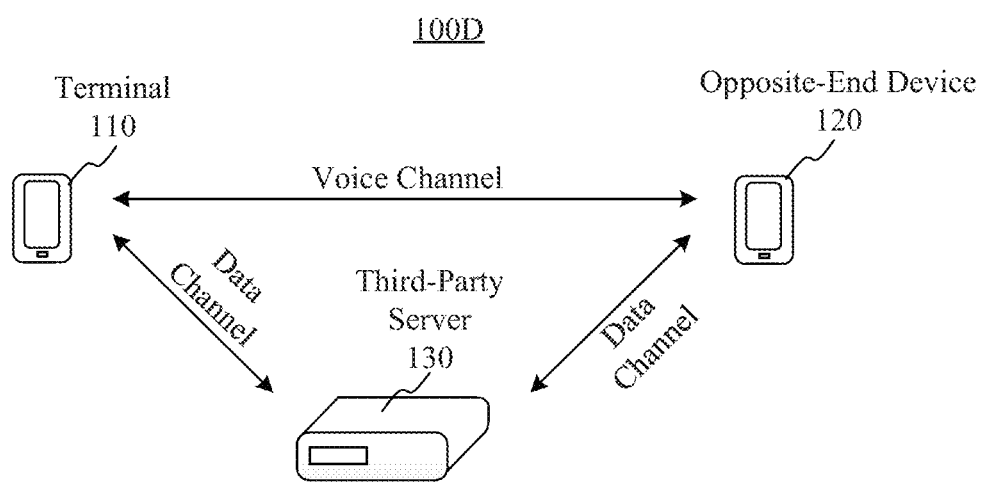

Referring to FIG. 1D, in the implementation environment 100D, the implementation environment 100 may further include a third-party sever 130. The opposite-end device 120 is similar to one of the opposite-end devices 120 in FIGS. 1A-1C. The third-party server 130 may be a single server, a server cluster consisting of several servers, a cloud-computing service center, etc. The terminal 110 may establish the voice channel with the opposite-end device 120 directly, and establish the data channel with the opposite-end device 120 through the third-part server 130.

Figure 2:
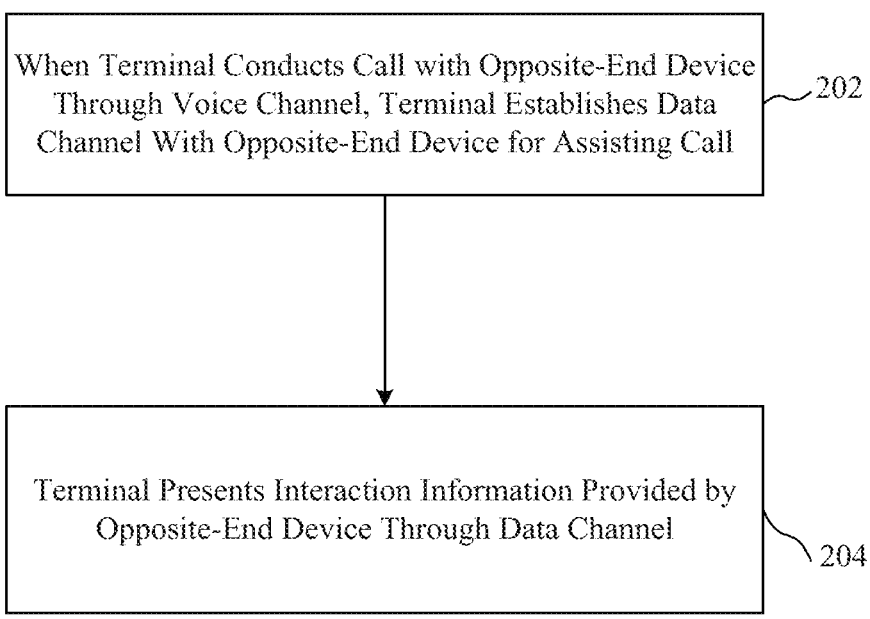
FIG. 2 is a flowchart of a calling method, according to an exemplary embodiment.

FIG. 2 is a flowchart of a calling method 200, according to an exemplary embodiment. For example, the method 200 may be used in a terminal, such as the terminal 110 (FIGS. 1A-1D). Referring to FIG. 2, the method 200 includes the following steps.

In step 202, when conducting a call with an opposite-end device through a voice channel, the terminal establishes a data channel with the opposite-end device for assisting the call.

In step 202, the terminal presents interaction information provided by the opposite-end device through the data channel. Users at both ends of the call coordinate and interact based on the interaction information and contents of the call.

Figure 3:
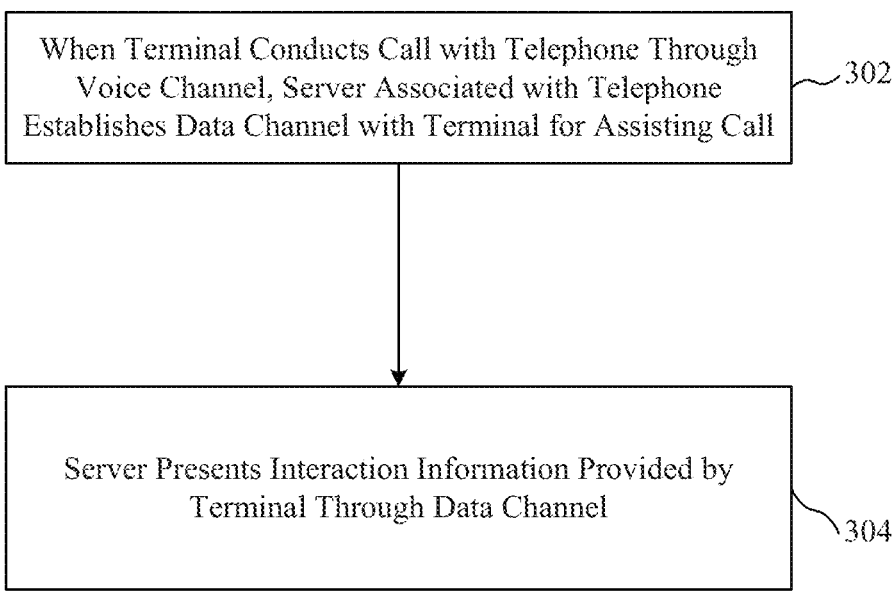
FIG. 3 is a flowchart of a calling method, according to an exemplary embodiment.

FIG. 3 is a flowchart of a calling method 300, according to an exemplary embodiment. For example, the method 300 may be used in a server, such as the server 124 (FIG. 1C). The server is associated with a telephone. The method 300 may include the following steps.

In step 302, when a terminal is conducting a call with the telephone through a voice channel, the server establishes a data channel with the terminal for assisting the call.

In step 304, the server presents interaction information provided by the terminal through the data channel. Users at bother ends of the call coordinate and interact based on the interaction information and contents of the call.

The methods 200 and 300 establish a data channel, in addition to a voice channel, and transmit interaction information through the data channel during a call. Thus, users at both ends of the call may combine the data channel with the voice channel to exchange information. This way, the efficiency of information exchange is improved.

In exemplary embodiments. "interaction information" may refer to first interaction information, second interaction information, or both the first and the second interaction information.

The first interaction information is provided by the opposite-end device to the terminal, and the second interaction information is provided by the terminal to the opposite-end device. Different from a videophone, the interaction information usually does not just refer to visual images of users at both ends of a call, but refers to information associated with contents of the call. The interaction information may include graphical interface information, audio information, control information, and the like. The interaction information and information on the voice channel used together may improve the efficiency of information exchange between the users. If the terminal and the opposite-end device are both mobile phones, the interaction information may include words, images, and sounds, present in the user interfaces. For example, mobile phone A's entire or partial user interface may be treated as the interaction information and be shared with mobile phone B. If the terminal is a mobile phone and the opposite-end device is associated with a service, the interaction information may include one or more service-information pages regarding the service. The service-information page(s) may be an information-displaying page, an information-collecting page, a service-providing page, a service-operating page, etc.

Figure 4:
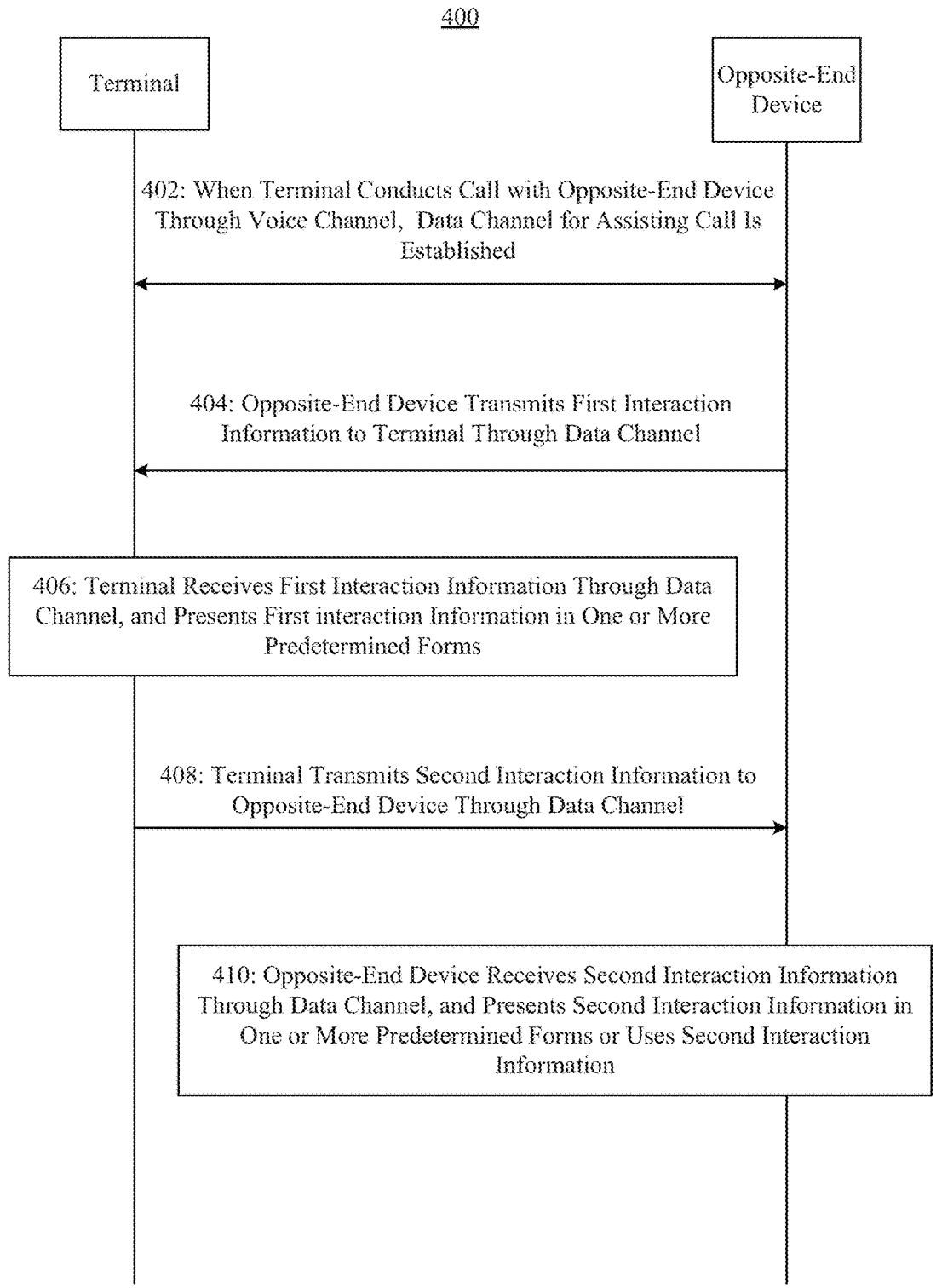
FIG. 4 is a flowchart of a calling method, according to an exemplary embodiment.

FIG. 4 is a flowchart of a calling method 400, according to an exemplary embodiment. For example, the method 400 may be used in the implementation environment 100A (FIG. 1A). Referring to FIG. 4, the method 400 may include the following steps.

In step 402, when a terminal is conducting a call with an opposite-end device through a voice channel, a data channel with the opposite-end device for assisting the call is established between the terminal and the opposite-end device.

In the present embodiment, since the opposite-end device is an independent calling device (FIG. 1A) similar to the terminal, the data channel is established directly between the terminal and the opposite-end device.

In exemplary embodiments, the data channel may be established at different timings. For example, the data channel may be established while the call is initiated, while the voice channel is established, or after the voice channel is established. The voice channel may be established either when the terminal initiates a call, or when the opposite-end device initiates a call.

The terminal establishes the data channel with the opposite-end device usually in the following two cases.

In the first case, the terminal determines whether the telephone number of the opposite-end device is a preset number. If the telephone number is a preset number, the terminal establishes the data channel. If the telephone number is not a preset number, the terminal does not establish the data channel.

The preset number may be preset by a user and saved locally in the terminal. The preset number may also be provided by a server, and then downloaded and saved locally by the terminal in advance. Moreover, the preset number may be stored in a server that the terminal has access to.

In the second case, the terminal establishes the data channel when receiving a trigger signal for establishing the data channel. The trigger signal may be initiated by a user of the terminal. Alternatively, the trigger signal may be sent by the opposite-end device, and then the user of the terminal may decide whether to establish the data channel.

In step 404, the opposite-end device transmits first interaction information to the terminal through the data channel.

In exemplary embodiments, the first interaction information may be transmitted in a web-page format. For example, the web page may be a picture, an entire or partial user interface of the opposite-end device, etc.

In step 406, the terminal receives the first interaction information through the data channel, and presents the first interaction information in one or more predetermined forms.

In exemplary embodiments, the terminal parses the first interaction information, and displays the first interaction information in a user interface, such as an incoming-call interface.

Depending on the type of the first interaction information, the predetermined form(s) may be at least one of displaying images or videos, playing sounds, and turning on signal lights.

For example, if the first interaction information received is a picture, the terminal may display the picture in a user interface so that the user of the terminal may modify or mark on the picture. The modified or marked picture may be served as second interaction information. Also for example, if the first interaction information are contents displayed on the screen of the opposite-end device, the terminal may display the contents so that the user of the terminal may instruct the user of the opposite-end device how to operate the opposite-end device by voice through the voice channel.

In step 408, the terminal generates and transmits second interaction information to the opposite-end device through the data channel.

For example, if the second interaction information is the modified or marked picture, the terminal transmits the modified or marked picture to the opposite terminal device.

In step 410, the opposite-end device receives the second interaction information through the data channel, and presents the second interaction information in one or more predetermined forms or uses the second interaction information.

For example, if the second interaction information is the modified or marked picture, the opposite-end device may display the picture on a screen so that the user of the opposite-end device can download the picture or use the picture as a wall paper.

In exemplary embodiments, steps 404-410, not necessarily in the above-recited order, may be repeatedly performed till the users at both ends of the call complete the information exchange. During the execution of the method 400, the users can use the voice channel to supplement and explain the information exchanged through the data channel.

By establishing and combining both the data channel and the voice channel, the method 400 improves the efficiency of information exchange, Moreover, by using multiple predetermined forms to present the information exchanged through the data channel, the method 400 expand the diversity of the information exchanged, also improving the efficiency of information exchange.

As an illustrative example for the method 400, a user B of the opposite-end device is unfamiliar with using microblogging on the opposite-device and wants to ask for help from a user A of the terminal. The user B may dial the telephone number of the terminal to establish a voice channel, and then a trigger signal for establishing a data channel is transmitted to the terminal. The terminal establishes the data channel after receiving the signal, and the user B may send the contents displayed on the screen of the opposite-end device as first interaction information to the terminal through the data channel. The terminal displays the first interaction information so that the user A may see the contents displayed on the screen of the opposite-end device. Then the user A may instruct the user B in real time through the voice channel. Alternatively and/or additionally, the user A may mark instructive operations on the contents displayed by the terminal and send the marked contents as second interaction information to the user B through the data channel. The user A may flexibly combine the voice and the visual aids to instruct the user B.

Figure 5A:
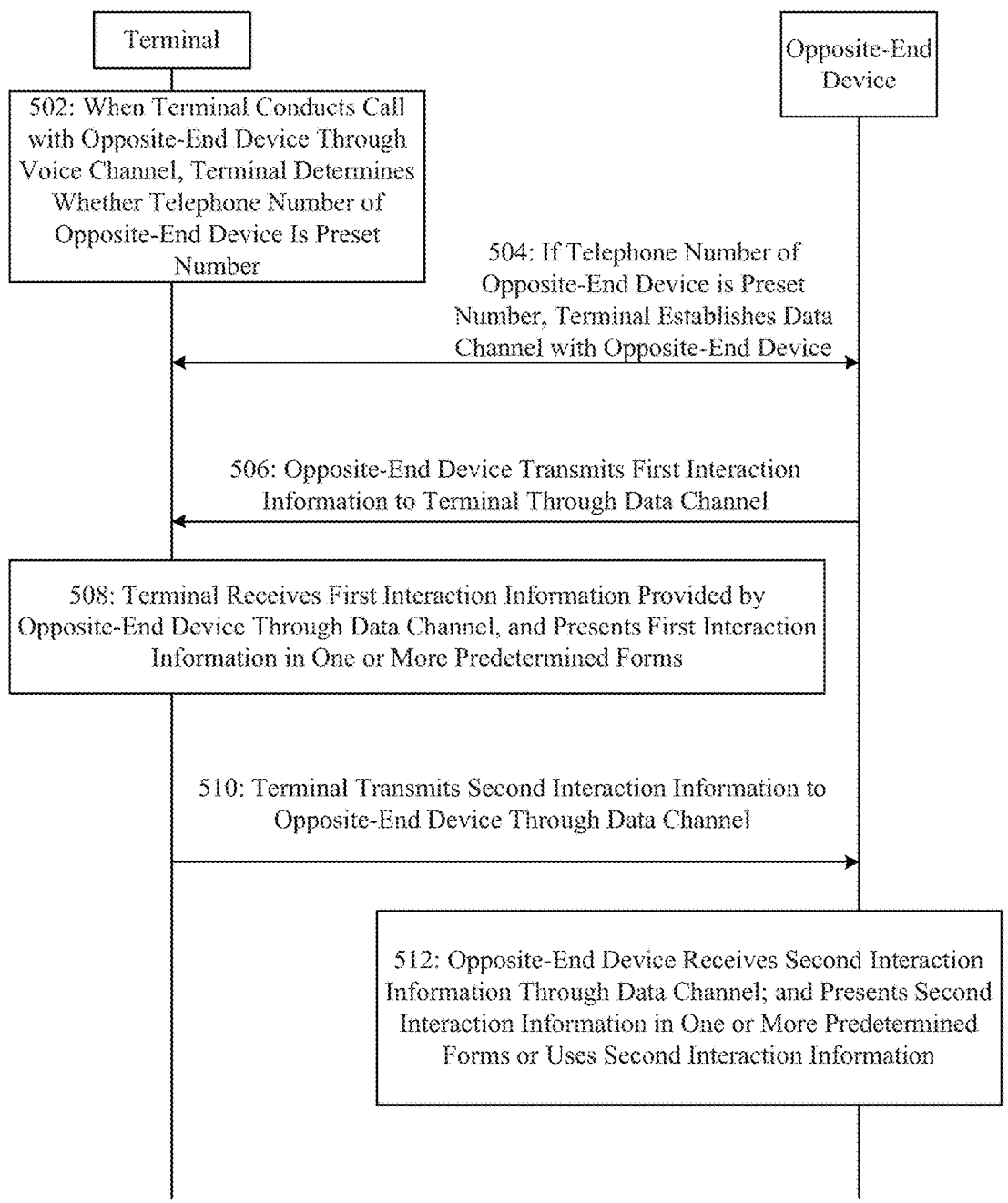
FIG. 5A is a flowchart of a calling method, according to an exemplary embodiment.

FIG. 5A is a flowchart of a calling method 500, according to an exemplary embodiment. For example, the method 500 may be used in the implementation environments 100B (FIG. 1B) or 100D (FIG. 1D). Referring to FIG. 5, the method 500 may include the following steps.

In step 502, when a terminal is conducting a call with an opposite-end device through a voice channel, the terminal determines whether a telephone number of the opposite-end device is a preset number.

For example, the voice channel may be established either when the terminal dials the telephone number of the opposite-end device, or when the terminal receives a call from the opposite-end device.

If the preset number is a service number, the terminal determines whether the telephone number of the opposite-end device is included in a preset service-number whitelist. For example, the service number can be a telephone number for fully-automated voice service or live-human service provided by a service provider, such as a catering service, a communication service, or a housekeeping service.

The service-number whitelist may be stored locally in the terminal or remotely in a third-party server. Specifically, the service-number whitelist may be stored locally in advance by a user, a terminal provider, or a service provider. The service-number whitelist may also be generated by a third-party server, and regularly downloaded and stored locally by the terminal. Moreover, the service-number whitelist may be stored in the third-party server. The terminal transmits the telephone number of the opposite-end device to the third-party server. The third-party server then determines whether the telephone number is in the whitelist, and returns the result to the terminal.

For example, an opposite-end device with a telephone number of 12345 may be associated with a communication service. The user of the terminal dials 12345 in the terminal to establish a voice channel with the opposite-end device. The terminal may determine locally or request a third-party server to determine whether 12345 is in the service-number whitelist. If 12345 is in the service-number whitelist, the terminal proceeds to step 504. Otherwise, the terminal stops performing the method 500.

In step 504, if the telephone number of the opposite-end device is a preset number, the terminal establishes the data channel with the opposite-end device.

In the illustrated embodiment, if the telephone number is not a present number, the terminal does not establish the data channel. That is, the terminal and the opposite-end device only have the voice channel.

The data channel may be established during the process of initiating the call, at the same time as the voice channel is established, or after the voice channel is established.

In exemplary embodiments, similar to the implementation environment 100B (FIG. 1B), both the terminal and the opposite-end device may be independent devices without relying on any third-party devices, such that the data channel is directly established between both devices. Alternatively, similar to the implementation environment 100D (FIG. 1D), the data channel between the terminal and the opposite-end device may be established through a third-party server.

In step 506, the opposite-end device transmits first interaction information to the terminal through the data channel.

For example, if the opposite-end device is associated with a service number, the first interaction information may include one or multiple service-information pages regarding the service provided through the service number.

The service-information page(s) may include at least one of an information-displaying page, an information-collecting page, a service-providing page, and a service-operating page. The information-displaying page may outline introductory information regarding various types of services. The information-collecting page may contain an input box for a user to input information. The service-providing page may be a game page provided during a service-waiting period, a query-result displaying page for a query service, an order-confirmation page after ordering a meal, etc. The service-operating page may contain one or multiple control items, such as a button and a menu.

The service-information page(s) may have a menu hierarchy and be transmitted in a web-page format. For example, the first interaction information may be a service-evaluation interface sent by the opposite-end device after a customer representative answers a service call.

In step 508, the terminal receives the first interaction information through the data channel, and presents the first interaction information in one or more predetermined forms or uses the first interaction information.

For example, the terminal parses the received first interaction information and then presents the service-information page(s) in a user interface in the predetermined form(s). Depending on the contents of the service-information page(s), the predetermined form(s) may include at least one of the following three forms: displaying images or videos, playing audio information, and turning on signal lights.

Moreover, the terminal presents the service information page(s) in the user interface in the following two manners.

In the first manner, the terminal presents the service-information page(s) according to the user's operation. Specifically, the terminal receives the user's operation on a service-information page. According to the operation, the terminal presents different forms of the service-information page or switch among multiple service-information pages.

For example, the service-information page may include a button. When the user clicks the button, the terminal requests from the opposite-end device a next service-information page corresponding to the button. If the request is successful, the terminal switches to the next service-information page.

In the second manner, the terminal presents the service-information page according to instructions by the opposite-end device. Specifically, the terminal receives a presentation-control instruction from the opposite-end device through the data channel. According to the instruction, the terminal presents different forms of the current service-information page or switch among multiple service-information pages.

In step 510, the terminal generates second interaction information and transmits the second interaction information to the opposite-end device through the data channel.

The terminal may generate the second interaction information by receiving the user's operations on the service-information page and converting the operations into the second interaction information.

Figure 5B:
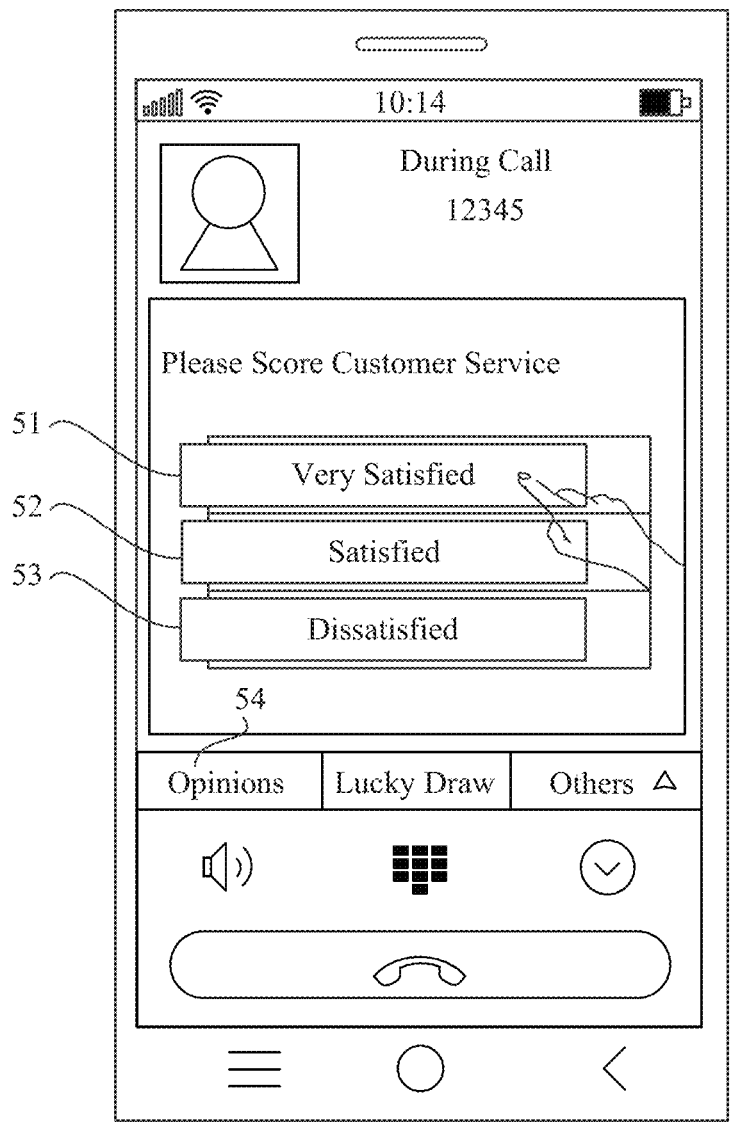
FIG. 5B is a schematic diagram illustrating an operation of a calling method, according to an exemplary embodiment.

FIG. 5B is a schematic diagram illustrating an operation of the calling method 500, according to an exemplary embodiment. Referring to FIG. 5B, for example, the first interaction information displayed by the terminal is a service-evaluation interface sent by a mobile carrier's customer-service representative. The user of the terminal may click the buttons 51, 52, and 53 in the interface to evaluate the service quality, and may also click the button 54 to express opinions. The information regarding the user's operations may serve as the second interaction information and be transmitted by the terminal to the opposite-end device through the data channel.

In step 512, the opposite-end device receives the second interaction information through the data channel, and presents the second interaction information in one or more predetermined forms or uses the second interaction information.

In the above example (FIG. 5B), the opposite-end device may display information regarding the user's evaluation on the screen, so that the customer-service staff operating the opposite-end device may view the user's level of satisfaction and opinion about the service. Alternatively, the opposite-end device may transmit the information to a server in the mobile carrier's headquarter office, so that the customer-service staff's performance can be appraised.

In exemplary embodiments, steps 506-512, not necessarily in the above-recited order, may be repeatedly performed till the two sides of the call complete the information exchange. During the execution of the method 500, the users at both ends of the call can use the voice channel to supplement and explain the information exchanged through the data channel.

Figure 6A:
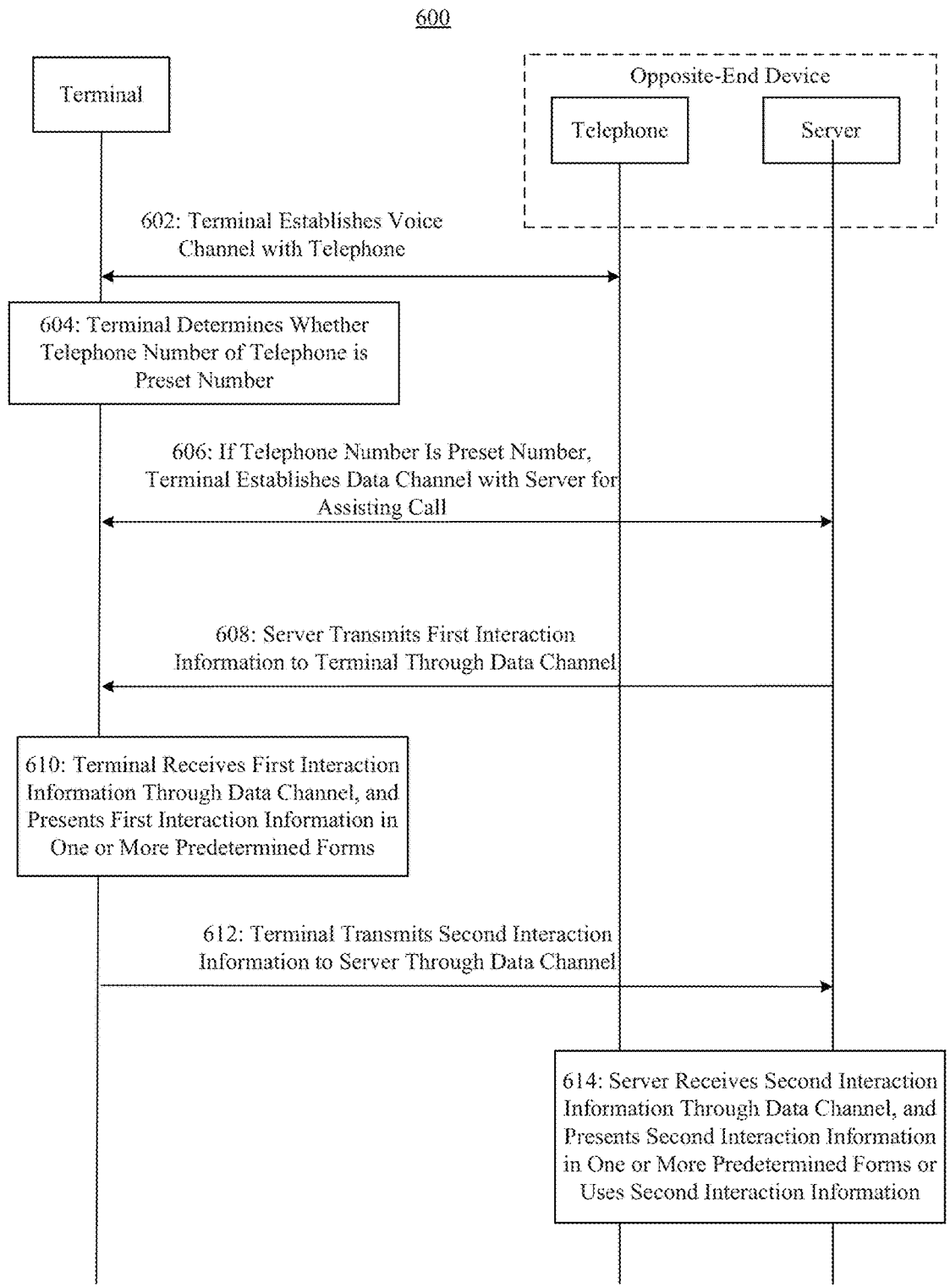
FIG. 6A is a flowchart of a calling method, according to an exemplary embodiment.

FIG. 6A is a flowchart of a calling method 600, according to an exemplary embodiment. For example, the method 600 may be used in the implementation environments 100C (FIG. 1C) or 100D (FIG. 1D). Referring to FIGS. 1C and 1D, the opposite-end device may include a telephone and a server associated with the telephone. The method 600 may include the following steps.

In step 602, the terminal and the telephone establish a voice channel.

The voice channel may be established either when the terminal dials the telephone, or when the telephone dials the terminal.

In step 604, similar to the step 502 in the method 500, the terminal determines whether the telephone number of the telephone is a preset number.

In step 606, similar to the step 504 in the method 500, if the telephone number of the telephone is a preset number, the terminal establishes the data channel with the server associated with the telephone, for assisting the call.

In exemplary embodiments, the data channel may be established between the terminal and the server associated with the telephone.

Alternatively, in exemplary embodiments, the data channel may be established through a third-party server belonging to a third-party service platform. This way, the terminal and the opposite-end device may exchange information through the third-party server. The third-party service platform may also acquire information transmitted through the third-party server to conduct statistical analysis. In one possible implementation manner, the terminal sends the third-party server a request for establishing the data channel. The request contains the telephone number of the opposite-end telephone. The third-party server first establishes a data channel with the terminal. The third-party server also searches for the server associated with the opposite-end telephone based on the telephone number, and then establishes a data channel with the associated server. The third-party server serves as a transit point of these two data channels so that the terminal and the server associated with the telephone can exchange information through the third-party server.

In step 608, similar to the step 506 in the method 500, the server associated with the telephone transmits first interaction information to the terminal through the data channel.

Similar to the method 500, if the opposite-end device is associated with a service number, the first interaction information may include one or more service-information pages In step 610, similar to the method 508 in the method 500, the terminal receives the first interaction information through the data channel, and presents the first interaction information in one or more predetermined forms or uses the first interaction information.

In step 612, similar to the step 510 in the method 500, the terminal generates the second interaction information, and transmits the second interaction information to the server associated with the telephone through the data channel.

In step 614, similar to the step 512 in the method 500, the server associated with the telephone receives the second interaction information through the data channel and presents the second interaction information in one or more predetermined forms or uses the second interaction information.

In exemplary embodiments, steps 608-614, not necessarily in the above-recited order, may be repeatedly performed till the two sides of the call complete the information exchange. During the execution of the method 600, the users at both ends of the call can use the voice channel to supplement and explain the information exchanged through the data channel.

Figure 6B:
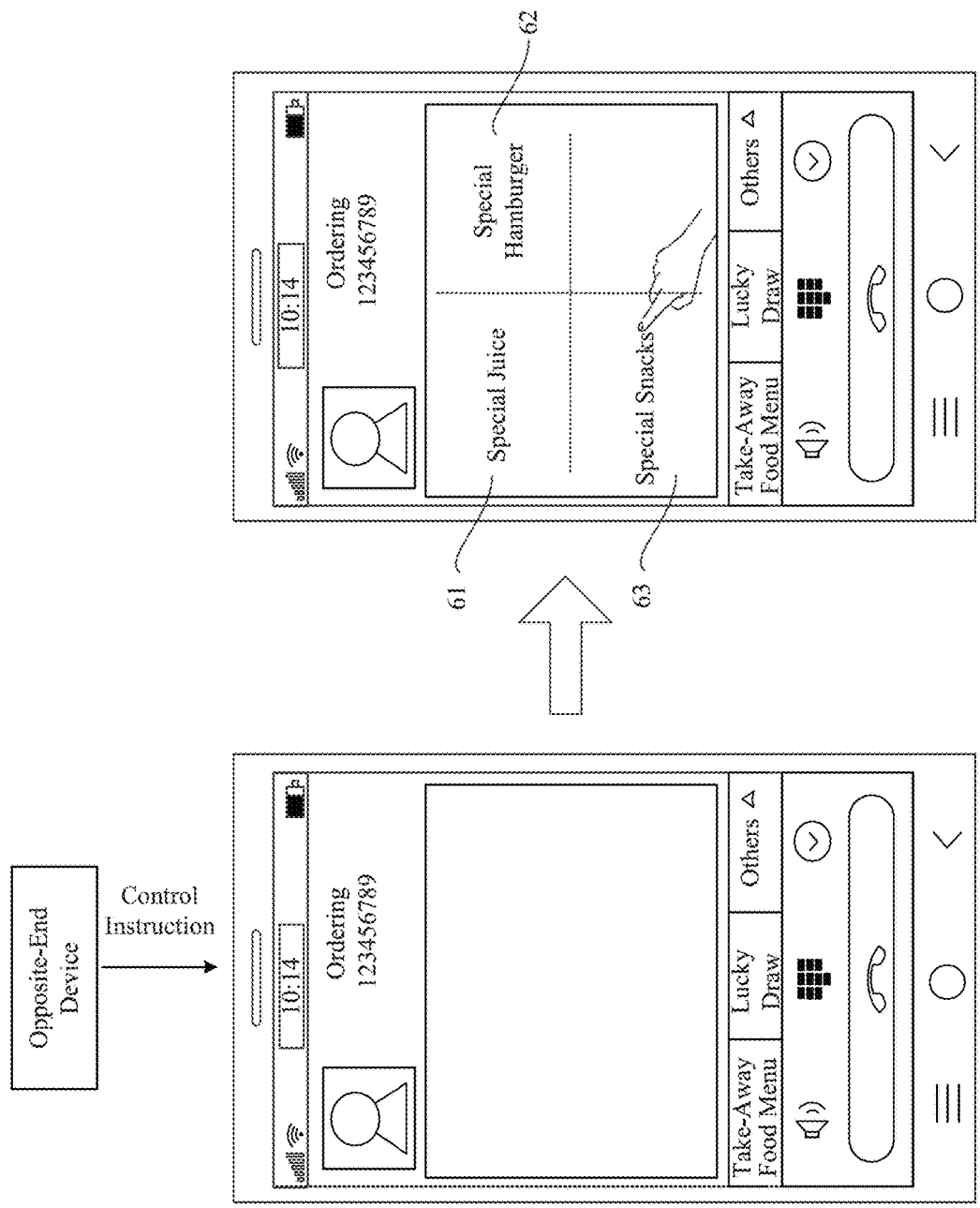
FIGS. 6B-6D are schematic diagrams illustrating operations of a calling method, according to exemplary embodiments.
Figure 6C:
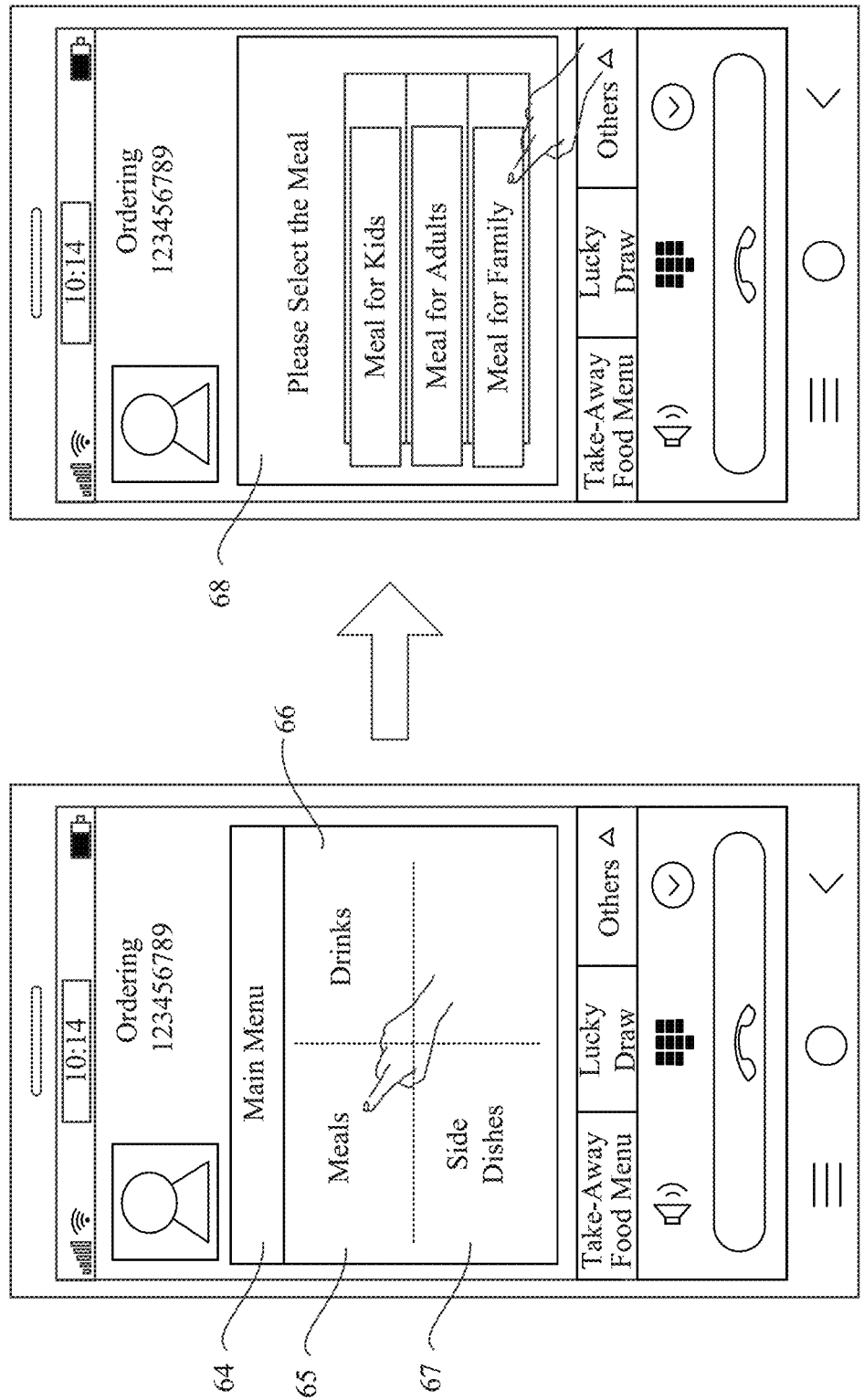
Figure 6D:
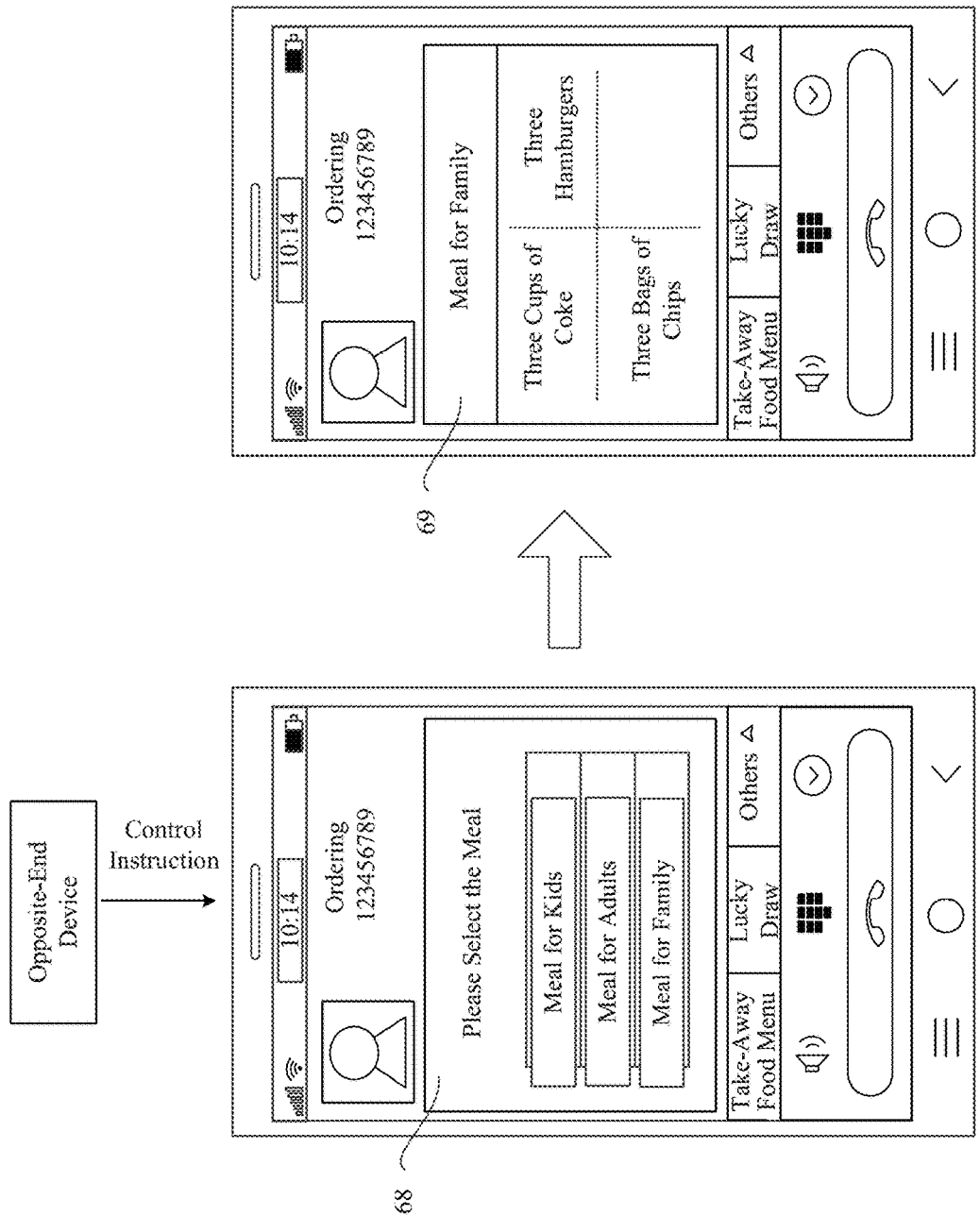

FIGS. 6B-6D are schematic diagrams illustrating operations of the calling method 600, according to exemplary embodiments. For example, in the method 600, the opposite-end device may belong to a fast-food restaurant. Referring to FIG. 6B, after a customer uses a terminal to establish a voice channel and a data channel with the opposite-end device, the terminal displays a blank interface by default. The service staff of the restaurant may send a latest daily-special menu to the terminal through the data channel, and controls the terminal to display the page. The page displays three special items, so that the customer may select the special items to be ordered on the page by clicking regions 61, 62, or 63. Referring to FIG. 6C, after the customer has purchased the special items or if the customer does not want any special item, the customer may ask the service staff to display the main menu. The service staff then controls the terminal to display the main menu 64. The customer may select the desired items by clicking regions 65, 66, or 67. After the customer clicks the region 65, the terminal receives a meal-selecting page 68 from the opposite-end device and displays the page 68. Referring to FIG. 6D, when the terminal displays the meal page 68, the customer may also ask the service staff questions about each meal through the voice channel. The service staff may also control the terminal to display a description page 69 of the meal inquired by the customer. Then the customer, through the voice channel, may order a meal according to the acquired information or request the service staff to switch to details pages of other meals.

Figure 7:
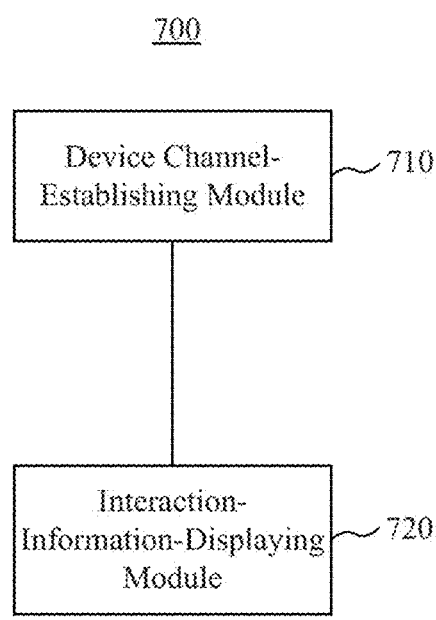
FIG. 7 is a block diagram of a calling device, according to an exemplary embodiment.

FIG. 7 is a block diagram of a calling device 700, according to an exemplary embodiment. The calling device 700 may constitute part or all of a terminal by means of software, hardware, or a combination of both. The calling device 700 may include a device channel-establishing module 710 and an interaction-information-displaying module 720.

The device channel-establishing module 710 is configured to establish a data channel with an opposite-end device for assisting a call, when the terminal conducts the call with the opposite-end device through a voice channel.

The interaction-information-displaying module 720 is configured to display interaction information provided by the opposite-end device through the data channel. Users at both ends of the call coordinate and interact based on the interaction information and contents of the call.

Figure 8:
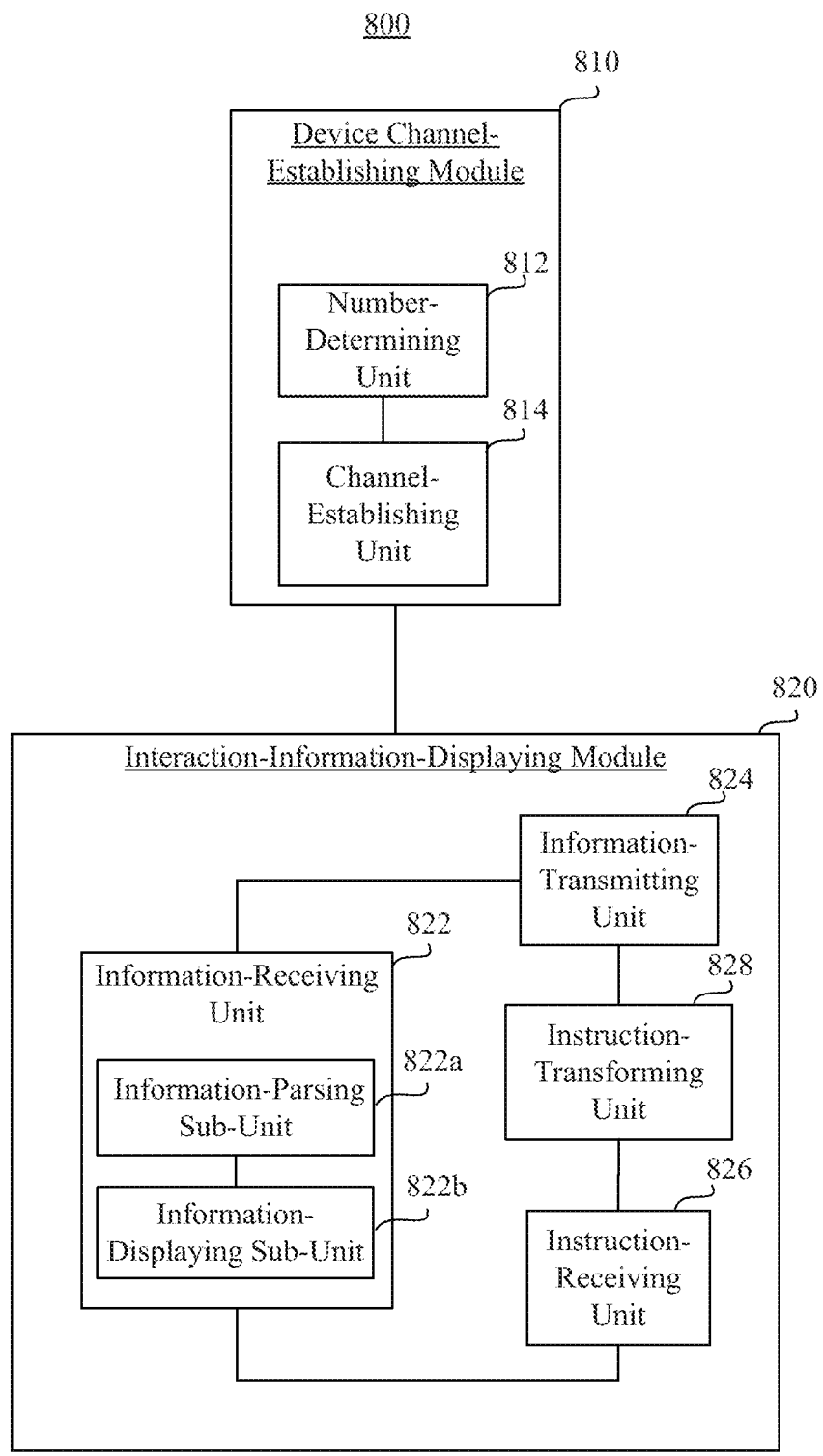
FIG. 8 is a block diagram of a calling device, according to an exemplary embodiment.

FIG. 8 is a block diagram of a calling device 800, according to an exemplary embodiment. The calling device 800 may constitute part or all of a terminal by means of software, hardware, or a combination of both. The calling device 800 may include a device channel-establishing module 810 and an interaction-information-displaying module 820, similar to the device channel-establishing module 710 and the interaction-information-displaying module 720 (FIG. 7), respectively.

In exemplary embodiments, the device cannel-establishing module 810 is further configured to establish a data channel with an opposite-end device for assisting a call, when receiving a trigger signal for establishing the data channel.

In exemplary embodiments, if the opposite-end device is an independent device (FIGS. 1A and 1B), the data channel may be established between the terminal and the opposite-end device. If the opposite-end device includes a telephone and a server associated with the telephone (FIG. 1C), the data channel may be established between the terminal and the server. Moreover, the device channel-establishing module 810 may be configured to establish the data channel with the opposite-end device through a third-party server (FIG. 1D).

In exemplary embodiments, the device channel-establishing module 810 may include a number-determining unit 812 and a channel-establishing unit 814. The number-determining unit 812 is configured to determine whether a telephone number of the opposite-end device is a preset number. If the preset number is a service number, the number-determining unit 812 may be further configured to determine whether the telephone number of the opposite-end device is included in a preset service-number whitelist, which may be stored either locally in the terminal or remotely in a third-party server. The channel-establishing unit 814 is configured to establish the data channel with the opposite-end device for assisting the call, if the telephone number is a preset number.

In exemplary embodiments, the interaction-information-displaying module 820 may include an information-receiving unit 822, and/or an information-transmitting unit 824. The information-receiving unit 822 is configured to receive first interaction information provided by the opposite-end device through the data channel, and present the first interaction information in one or more predetermined forms. The information-transmitting unit 824 is configured to transmit second interaction information to the opposite-end device through the data channel. The predetermined form(s)

includes at least one of displaying images or videos, playing sounds, and turning on signal lights.

In exemplary embodiments, the information-receiving unit 822 may include an information-parsing sub-unit 822a and an information-displaying sub-unit 822b. The information-parsing sub-unit 822a is configured to, when the first interaction information includes one or more service-information pages associated with a service number, parse the service-information page(s). The service-information page(s) includes at least one of an information-displaying page, an information-collecting page, a service-providing page, and a service-operating page. The information-displaying sub-unit 822b is configured to display the service-information page in the terminal's user interface. For example, the information-displaying sub-unit 822b may be configured to display the service-information page according to a user's operations. Also for example, the information-displaying sub-unit 822b may be configured to display the service-information page according to instructions by the opposite-end device.

In exemplary embodiments, the interaction-information-displaying module 820 may further include an instruction-receiving unit 826 and an instruction-transforming unit 828. The instruction-receiving unit 826 is configured to receive a user's operation on a service-information page displayed in the user interface. The service-information page is the first interaction information. The instruction-transforming unit 828 is configured to transform the operation into the second interaction information.

Figure 9:
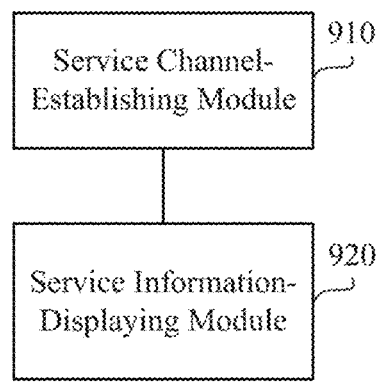
FIG. 9 is a block diagram of a calling device, according to an exemplary embodiment.

FIG. 9 is a block diagram of a calling device 900, according to an exemplary embodiment. The calling device 900 may constitute part or all of a server by means of software, hardware, or a combination of both. The server is associated with a telephone. The calling device 900 may include a service channel-establishing module 910 and a service information-displaying module 920.

The service channel-establishing module 910 is configured to establish a data channel with a terminal for assisting a call, when the call is conducted between the terminal and the telephone through a voice channel.

The service information-displaying module 920 is configured to display interaction information provided by the terminal through the data channel. Users at both ends of the call coordinate and interact based on the interaction information and contents of the call.

Figure 10:
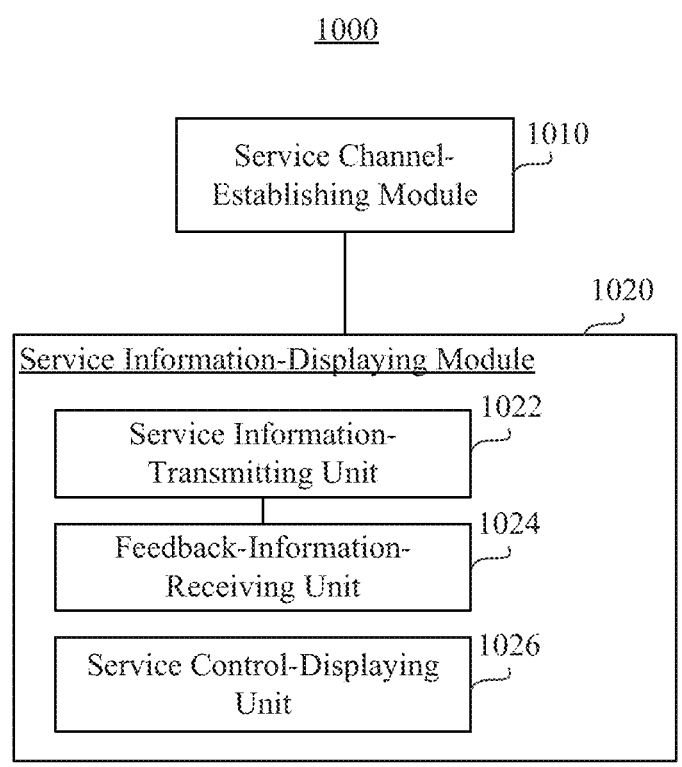
FIG. 10 is a block diagram of a calling device, according to an exemplary embodiment.

FIG. 10 is a block diagram of a calling device 1000, according to an exemplary embodiment. The calling device 1000 may constitute part or all of a server by means of software, hardware, or a combination of both. The server is associated with a telephone. The calling device 1000 may include a service channel-establishing module 1010 and a service information-displaying module 1020, similar to the service channel-establishing module 910 and the service information-displaying module 920, respectively.

In exemplary embodiments, the service channel-establishing module 1010 may be configured to establish the data channel with a terminal through a third-party service platform.

In exemplary embodiments, the service information-display module 1020 may include a service information-transmitting unit 1022, and/or a feedback-information-receiving unit 1024. The service information-transmitting unit 1022 is configured to transmit first interaction information to the terminal through the data channel. The feedback-information-receiving unit 1024 is configured to receive second interaction information provided by the terminal through the data channel, and presents the second interaction information in one or more predetermined forms or uses the second interaction information. The predetermined form includes at least one of displaying images or videos, playing sounds, and turning on signal lights.

In exemplary embodiments, if the server is associated with a service number, the first interaction information includes one or more service-information pages regarding service provided through the service number. The service-information page(s) includes at least one of an information-displaying page, an information-collecting page, a service-providing page, and a service-operating page.

In exemplary embodiments, the service information-displaying module 1020 may further include a service control-displaying unit 1026, configured to control display of the service-information page in the terminal.

In exemplary embodiments, when a user operates on the service-information page displayed in the terminal, the terminal receives the operation and transforms the operation into the second interaction information.

Figure 11:
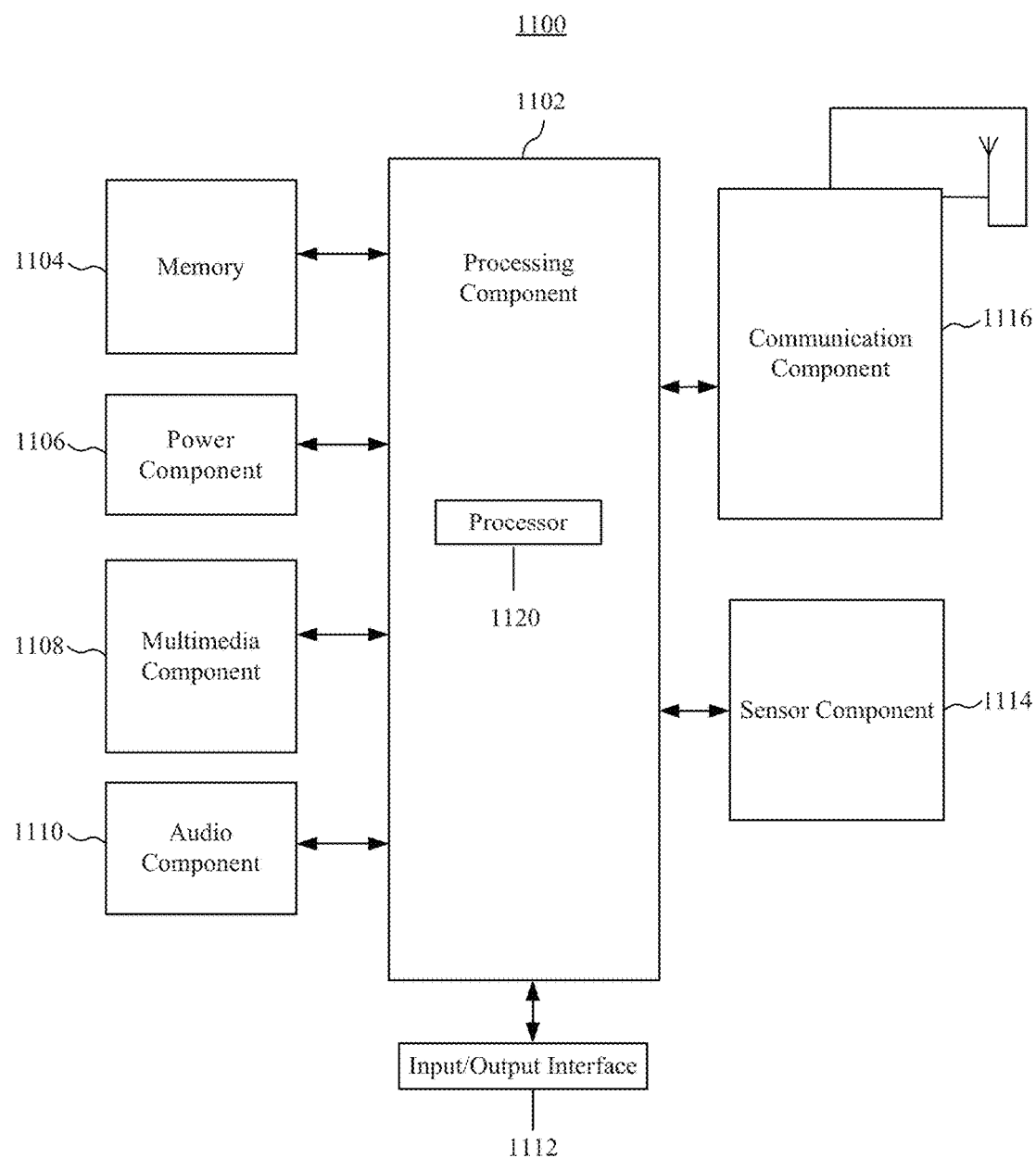
FIG. 11 is a block diagram of a calling device, according to an exemplary embodiment.

FIG. 11 is a block diagram of a calling device 1100, according to an exemplary embodiment. For example, the device 1100 may be a mobile phone, a computer, a digital broadcast terminal, a messaging device, a gaming console, a tablet, a medical device, exercise equipment, a personal digital assistant, and the like.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above-described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and/or the rear camera may receive an external multimedia datum while the device 1100 is in an operation mode, such as a photographing mode or a video mode. Each of the front camera and the rear camera may be a fixed optical lens system or may have focus and optical zoom capability.

The audio component 1110 is configured to output and/or input audio signals. For example, the audio component 1110 includes a microphone configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect open/closed statuses of the device 1100, and relative positioning of components, such as the display and the keypad. The sensor component 1114 may also detect position changes of the device 1100 or a component of the device 1100, presence or absence of user contacts with the device 1100, orientation or acceleration/deceleration of the device 1100, and temperature changes of the device 1100. The sensor component 1114 may further include a proximity sensor configured to detect the presence of nearby objects without any physical contact. Moreover, the sensor component 1114 may include a light sensor, such as a CMOS or CCD image sensor, for use in imaging applications. In some embodiments, the sensor component 1114 may also include an acceleration sensor, a gyroscope sensor, a magnetic sensor, a pressure sensor, or a temperature sensor.

The communication component 1116 is configured to facilitate wired or wireless communication between the device 1100 and other devices. The device 1100 can access a wireless network based on a communication standard, such as WiFi, 2G, 3G, or a combination thereof. In one exemplary embodiment, the communication component 1116 receives a broadcast signal or broadcast related information from an external broadcast management system via a broadcast channel. In another exemplary embodiment, the communication component 1116 further includes a near-field communication (NFC) module to facilitate short-range communications. The NFC module, for example, may be implemented based on a radio frequency identification (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

In exemplary embodiments, there is also provided a non-transitory computer-readable storage medium storing instructions, such as stored in the memory 1104, executable by the processor 1120 in the device 1100, for performing the above-described methods. For example, the non-transitory computer-readable storage medium may be a ROM, a random access memory (RAM), a CD-ROM, a magnetic tape, a floppy disc, an optical data storage device, and the like.

Figure 12:
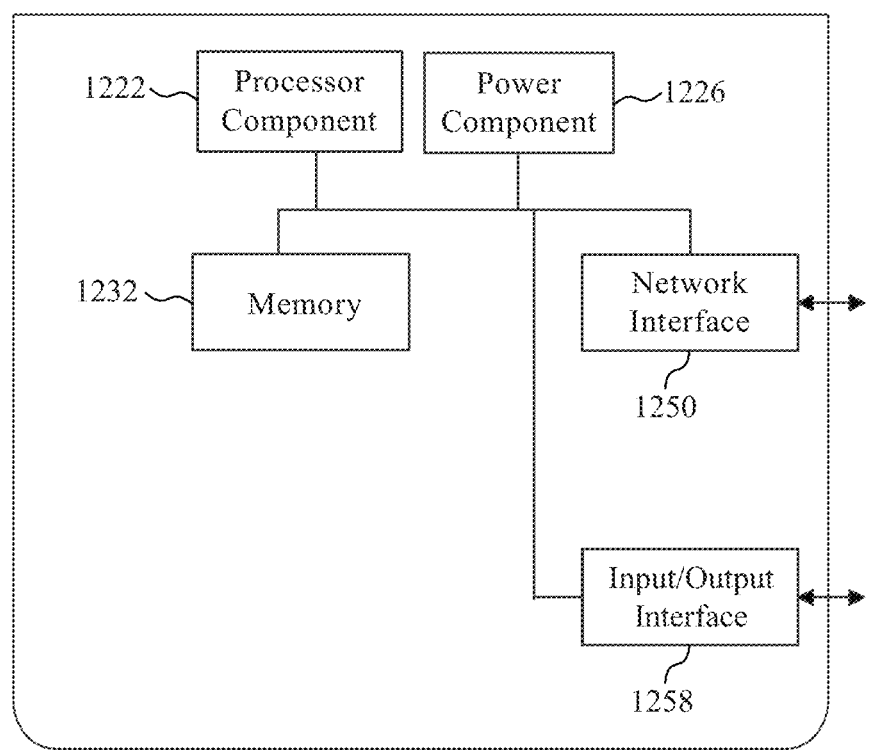
FIG. 12 is a block diagram of a calling device, according to an exemplary embodiment.

FIG. 12 is a block diagram showing a calling device 1200, according to an exemplary embodiment. For example, the device 1200 may be provided as a server associated with a calling device. Referring to FIG. 12, the device 1200 includes a processing component 1222 that further includes one or more processors, and memory resources represented by a memory 1232 for storing instructions executable by the processing component 1222, such as application programs. The application programs stored in the memory 1232 may include one or more modules each corresponding to a set of instructions. Further, the processing component 1222 is configured to execute the instructions to perform the above-described methods.

The device 1200 may also include a power component 1226 configured to perform power management of the device 1200, wired or wireless network interface(s) 1250 configured to connect the device 1200 to a network, and an input/output (I/O) interface 1258. The device 1200 may operate based on an operating system stored in the memory 1232, such as Windows Server™, Mac OS XT™, Unix™, Linux™, FreeBSD™, and the like.

In exemplary embodiments, there is also provided a non-transitory computer-readable storage medium storing instructions, such as stored in the memory 1232, executable by the processor 1222 in the device 1200, for performing the above-described methods. For example, the non-transitory computer-readable storage medium may be a ROM, RAM, a CD-ROM, a magnetic tape, a floppy disc, an optical data storage device, and the like.

Figure 13:
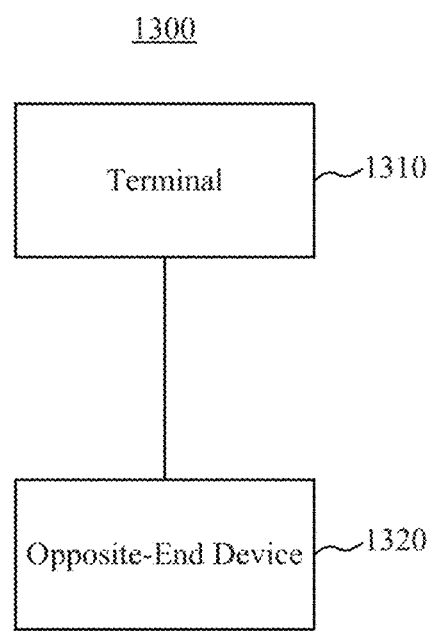
FIG. 13 is a block diagram of a calling system, according to an exemplary embodiment.

FIG. 13 is a block diagram of a calling system, according to an exemplary embodiment. The system includes a terminal 1310 and an opposite-end device 1320.

The terminal 1310 may be any one of the devices 700 (FIG. 7), 800 (FIG. 8), and 1100 (FIG. 11).

The opposite-end device 1320 may be a device identical to the terminal 1310, or any one of the devices 900 (FIG. 9), 1000 (FIG. 10), and 1200 (FIG. 12).

One of ordinary skill in the art will understand that the above-described modules/units can each be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A terminal, comprising:
a processor; and
a memory for storing instructions executable by the processor;
wherein the processor is configured to:
establish a data channel with a device for assisting a call, when the terminal is conducting the call with the device through a voice channel; and
exchange interaction information with the device through the data channel, wherein the interaction information is configured to assist a first user of the terminal and a second user of the device in coordinating and interacting when conducting the call, and wherein the exchanging of the interaction information with the device includes:
receive first interaction information provided by the device through the data channel;
present the first interaction information in a predetermined form, wherein when the first interaction information includes a service-information page, the presenting of the first interaction information in the predetermined form includes:
parsing the service-information page; and
presenting the service-information page in a user interface; and
transmit second interaction information to the device through the data channel.

2. The terminal according to claim 1, wherein the processor is further configured to:
determine whether a telephone number of the device is a preset number; and
when the telephone number is a preset number, establish the data channel with the device for assisting the call.

3. The terminal according to claim 1, wherein
when the device is an independent calling device, the data channel is established between the terminal and the independent calling device; and
when the device includes a telephone and a server associated with the telephone, the data channel is established between the terminal and the server.

4. The terminal according to claim 1, wherein the terminal establishes the data channel with the device through a third-party server.

5. The terminal according to claim 1, wherein the predetermined form for presenting the first interaction information is one of displaying an image or video, playing a sound, or turning on a signal light.

6. The terminal according to claim 1, wherein the service-information page includes at least one of an information-displaying page, an information-collecting page, a service-providing page, or a service-operating page regarding a service.

7. The terminal according to claim 1, wherein the processor is further configured to:
present the service-information page according to a user's operation or according to an instruction by the device.

8. The terminal according to claim 1, wherein the processor is further configured to:
when the first interaction information includes the service-information page, receive an operation by a user on the service-information page; and
transform the operation into the second interaction information;
wherein the service-information page includes at least one of an information-displaying page, an information-collecting page, a service-providing page, or a service-operating page regarding a service.

9. A server associated with a telephone, comprising:
a processor; and
a memory for storing instructions executable by the processor;
wherein the processor is configured to:
establish a data channel with a terminal for assisting a call, when the telephone is conducting the call with the terminal through a voice channel; and
exchange interaction information with the terminal through the data channel, wherein the interaction information is configured to assist a first user of the terminal and a second user of the telephone in coordinating and interacting when conducting the call, and wherein the exchanging of the interaction information with the terminal includes:
transmitting first interaction information to the terminal through the data channel;
when the first interaction information includes a service-information page, controlling presentation of the service-information page in the terminal;
receiving second interaction information provided by the terminal through the data channel; and
presenting the second interaction information in a predetermined form or using the second interaction information.

10. The server according to claim 9, wherein
the server establishes the data channel with the terminal for assisting the call through a third-party server.

11. The server according to claim 9, wherein
when the server is associated with a service number, the service-information page is associated with the service number and includes at least one of an information-displaying page, an information-collecting page, a service-providing page, or a service-operating page regarding a service.

12. The server according to claim 11, wherein the processor is further configured to:
receive a user operation on the service-information page; and
transform the user operation into the second interaction information.

13. A non-transitory computer-readable medium having stored therein instructions that, when executed by a processor of a terminal configured to communicate with a device, causes the terminal to perform a calling method, the method comprising:
establishing a data channel with the device for assisting a call, when the terminal is conducting the call with the device through a voice channel; and
exchanging interaction information with the device through the data channel, wherein the interaction information is configured to assist a first user of the terminal and a second user of the device in coordinating and interacting when conducting the call, and wherein the exchanging of the interaction information with the device includes:
receiving first interaction information provided by the device through the data channel;

presenting the first interaction information in a predetermined form, wherein when the first interaction information includes a service-information page, the presenting of the first interaction information in the predetermined form includes:
    parsing the service-information page; and
    presenting the service-information page in a user interface; and
transmitting second interaction information to the device through the data channel.

14. The non-transitory computer-readable medium according to claim 13, wherein the establishing of the data channel with the device comprises:
    determining whether a telephone number of the device is a preset number; and
    when the telephone number is a preset number, establishing the data channel with the device for assisting the call.

15. The non-transitory computer-readable medium according to claim 13, wherein
    when the device is an independent calling device, the data channel is established between the terminal and the independent calling device; and
    when the device includes a telephone and a server associated with the telephone, the data channel is established between the terminal and the server.

16. The non-transitory computer-readable medium according to claim 13, wherein the terminal establishes the data channel with the device through a third-party server.

17. The non-transitory computer-readable medium according to claim 13, wherein the predetermined form for presenting the first interaction information is one of displaying an image or video, playing a sound, or turning on a signal light.

18. The non-transitory computer-readable medium according to claim 13, wherein the service-information page includes at least one of an information-displaying page, an information-collecting page, a service-providing page, or a service-operating page regarding a service.

19. The non-transitory computer-readable medium according to claim 13, wherein the presenting of the service-information page in the user interface comprises:
    presenting the service-information page according to a user's operation or according to an instruction by the device.

20. The non-transitory computer-readable medium according to claim 13, wherein the method further comprises:
    when the first interaction information includes the service-information page, receiving an operation by a user on the service-information page; and
    transforming the operation into the second interaction information;
    wherein the service-information page includes at least one of an information-displaying page, an information-collecting page, a service-providing page, or a service-operating page regarding a service.

\* \* \* \* \*